(12) United States Patent
Jackson (10) Patent No.: US 6,948,886 B1
(45) Date of Patent: Sep. 27, 2005

(54) SYSTEM AND METHOD FOR PREVENTING BLUFF EROSION

(75) Inventor: Gary A. Jackson, Cedarburg, WI (US)

(73) Assignee: Edward E. Gillen Co., Milwaukee, WI (US)

( * ) Notice: Subject to any disclaimer, the term of this patent is extended or adjusted under 35 U.S.C. 154(b) by 0 days.

(21) Appl. No.: 10/916,664

(22) Filed: Aug. 12, 2004

(51) Int. Cl.[7] .................... E02D 17/20; E02B 11/00
(52) U.S. Cl. .............. 405/302.6; 405/45; 405/43; 405/36
(58) Field of Search ............. 405/302.6, 302.4, 405/36, 43, 44, 45, 50, 57

(56) References Cited

U.S. PATENT DOCUMENTS

| 599,719 | A | | 3/1898 | Manning |
| 1,344,656 | A | | 6/1920 | Saltsman |
| 1,866,826 | A | * | 7/1932 | Strothmann ............... 405/45 |
| 2,514,509 | A | * | 7/1950 | O'Neal .................... 405/45 |
| 3,625,010 | A | * | 12/1971 | Hakundy ................... 405/38 |
| 4,655,637 | A | | 4/1987 | Vignocchi |
| 4,666,334 | A | | 5/1987 | Karaus |
| 4,714,376 | A | | 12/1987 | Jenab |
| 4,768,897 | A | | 9/1988 | Nussbaumer et al. |
| 4,863,312 | A | | 9/1989 | Cavalli |
| 5,015,122 | A | | 5/1991 | Combes |
| 5,597,045 | A | | 1/1997 | Sass et al. |
| 5,780,144 | A | | 7/1998 | Bradley |
| 5,820,296 | A | | 10/1998 | Goughnour |
| 6,161,776 | A | | 12/2000 | Byles |
| 6,280,117 | B1 | | 8/2001 | Obermeyer et al. |
| 6,607,332 | B2 | * | 8/2003 | Kang ..................... 405/302.4 |
| 6,612,778 | B1 | | 9/2003 | Jackson |

* cited by examiner

Primary Examiner—Frederick L. Lagman
(74) Attorney, Agent, or Firm—Andrus, Sceales, Starke & Sawall, LLP (57) ABSTRACT

An improved system is provided for preventing erosion of a bluff or hillside having a face extending between a toe at a bottom thereof and a crest at a top surface thereof, a water saturated zone extending rearwardly from the face, and a failure shear plane. The bluff or hillside is subject to excess water accumulation contributing to land mass degradation. The invention is improved by at least one drain member or wicking drain positioned behind the failure shear plane and extending downwardly and forwardly only along a single radius towards the face of the bluff and through the water saturated zone between the top surface of the bluff and the face of the bluff for the purpose of controlling drainage of the excess water accumulation. The drain member or wicking drain is installed from the top surface of the bluff or hillside so as not to impair the structural integrity and cause land mass degradation of the face thereof.

10 Claims, 6 Drawing Sheets

SYSTEM AND METHOD FOR PREVENTING BLUFF EROSION

FIELD OF THE INVENTION

This invention relates generally to erosion control of bluffs, hillsides and the like and, more particularly, pertains to an improved system and method for stabilizing the bluff or hillside by controlling the internal water drainage so as to prevent landslides or similar land mass slumping along the face or slope of the bluff or hillside.

BACKGROUND OF THE INVENTION

The erosion of bluffs lying adjacent a lake or ocean has constituted a long and serious environmental problem. These bluffs are subject to the action of the waves occasionally pounding against them which erode away the base of the bluff leaving the bluff with an extremely steep face. This steep front face is very unstable and, in some instances, is not able to support the weight of the dirt, sand and the like lying above it. Consequently, landslides or slumping may occur which can endanger man-made structures as well as trees and bushes on top of the bluff.

These bluffs as well as hillsides, such as those which slope down to a highway, are also subject, on a larger scale, to the action of forces acting within as caused by groundwater and water from spray, rain or snow melt which matriculates to various layers running through and exiting out the base of the bluffs or hillsides. If the water saturation becomes excessively high, the outwardly exerting forces cause collapse of the steep base of the bluff or hillside, sometimes along an appreciable length thereof.

One prior attempt to mitigate degradation of a hillside is disclosed in U.S. Pat. No. 4,714,376 issued Dec. 22, 1987 to Jenab. In this patent, a perforated drain pipe is placed within a hillside substantially parallel to the face of the hillside at a location on or above an impermeable layer. Jenab is primarily concerned with control of water drainage at the bottom of the hillside, and is limited to boring holes, construction of a concrete apron and placement of a drain pipe at locations close to the face of the hillside near its bottom edge where a bulldozer is used to facilitate installation. While the '376 patent discloses a use of another drain pipe at a higher level of the hillside, it is only possible that the location of such pipe is within the reaching limits of the bulldozer leading one to believe it must be near the bottom of the hillside. Installation of Jenab's drain pipes through the front face of the hillside would thus appear to contribute to the collapse of the front face of the hillside, the very problem which the present invention seeks to prevent.

Another attempt to rectify bluff erosion by controlling internal water drainage has resulted in installing wicking drains through the face of the bluff at angles generally perpendicular thereto. These installations are effected by forming a series of bores in upper elevations of the bluff using drilling equipment mounted on a support device suspended outside the face of the bluff. While such installations have been generally acceptable for their intended purpose, they have not proven to be as efficient as desired in regulating bluff drainage. They can also exacerbate the problem because they conduct water and turn many drilled holes perpendicular to the bluff which adds water to the mass between the bluff shear failure plane and the bluff face.

In view of the prior art drawbacks, applicant has developed a system and method for preventing bluff erosion as set forth in U.S. Pat. No. 6,612,778 issued Sep. 2, 2003. In this system, at least one wicking drain is positioned behind a shear failure plane and a water saturated zone or sand layer substantially parallel to the crest of the bluff or hillside for the purpose of controlling drainage of the excess water accumulation. The wicking drain extends downwardly in the bluff, laterally along and parallel to the crest of the bluff and then curves forwardly to the face of the bluff where it exits from the water saturated zone at an elevation upwardly on the face of the bluff. A collector drain pipe is connected to a distal end of the wicking drain for returning excess water accumulated in the drain to an adjacent body of water. The wicking drain is installed from the top surface of the bluff so as not to impair the structural integrity and cause land mass degradation thereof.

While this system has performed generally satisfactorily, it has been found that, in operation, the water table is at a depth in the bluff such that it has been difficult to constantly locate the wicking drain in the water saturated zone with the result that drainage has not been maximized. In addition, the wicking drain in this system extends only through a portion of the water bearing sand layer such that it somewhat limits the overall drainage of the bluff. It has also been discovered that excess tension can be placed on the wicking drain during its installation which may cause abrasion or other damage thereto and further impairs the dewatering results.

Accordingly, it is desirable to provide an upgraded system and method for preventing bluff or hillside erosion which is more efficient in stabilizing the face of the bluff or hillside by controlling the water seepage therein.

SUMMARY OF THE INVENTION

It is a general object of the present invention to provide a novel and improved system which alters the natural drainage of water from the bluff so as to substantially preserve the formation thereof.

It is also an object of the present invention to strategically position an elongated drainage member or wicking drain behind a shear failure plane so that it extends downwardly and forwardly through a water saturated layer between a top surface of the bluff and a face of the bluff adjacent the toe thereof.

It is a further object of the present invention to provide a unique method of more carefully installing a wicking drain in a bluff using conventional drilling equipment.

It is an additional object of the present invention to provide a system for lowering the water level and allowing drainage for maintaining the lowered water level in a bluff on a long term basis.

It is another object of the present invention to provide a bluff erosion protection system which eliminates the need for insertion of drainage structure by drilling or excavating from the face of the bluff or hillside.

A still further object of the present invention is to provide a de-watering system for a bluff which does not require permanent supplemental physical structure at the face or along the slope of the bluff.

In one aspect of the invention, a system is provided for preventing erosion of a bluff or hillside having a face extending between a toe at a bottom thereof and a crest at a top surface thereof, a water saturated zone extending rearwardly from the face and a failure shear plane. The bluff or hillside is subject to excess water accumulation contributing to land mass degradation thereof. The system is improved by at least one drain member positioned behind the failure shear plane and extending downwardly and forwardly through the entire water saturated zone between the top surface of the bluff and the face of the bluff adjacent the toe thereof for the purpose of controlling drainage of the excess water accumulation. The drain member is installed from the top surface of the bluff or hillside so as not to impair the structural integrity or cause land mass degradation of the face thereof. The drain member has a proximal end located at a top surface of the bluff or hillside, a medial portion extending completely through a height of the water saturated zone and a distal end projecting from the face of the bluff or hillside adjacent the toe thereof. The drain member is installed in a hole formed by a horizontal directional boring machine positioned on the top surface of the bluff or hillside.

In another aspect of the invention, in a bluff lying adjacent a body of water and having a shear failure plane, a face extending from a toe at the bottom of the bluff to a crest at a top surface of the bluff and a water saturated zone extending rearwardly from the face, there is provided a drainage system for preventing erosion of the bluff caused by excess water forces acting outwardly towards the face of the bluff. The system includes an elongated bore extending continuously downwardly and forwardly towards the face of the bluff behind the shear failure plane. The bore has a first end at the top surface of the bluff and a second end at a lower elevation extending through a bottom end of the face of the bluff adjacent the toe, the bore being started from the top surface of the bluff. An elongated wicking drain has a plastic corrugated core surrounded by a filtering fabric and is positioned within the bore, the wick drain further having a proximal end at the first end of the bore, a medial portion extending through the entire height of the water saturated zone and a distal end at the second end of the bore. The water saturated zone preferably includes a water attracting sand layer. The bore includes a slurry for facilitating the positioning of the wicking drain therein.

The invention further contemplates a method for preventing erosion in a face of a bluff having accumulated water therein, the face running from a toe of the bluff to a crest of the bluff at a top surface thereof. The method includes the steps of drilling a series of substantially vertical holes into the top surface of the bluff to locate a shear failure plane behind a line extending from the toe of the bluff to the top surface of the bluff, and to locate water in the bluff; advancing a drill string behind the shear failure plane from an out hole at a top surface of the bluff continuously downwardly and forwardly on a radius through an entire height of a water saturated zone extending rearwardly from the face and then outwardly along the radius to the face of the bluff in the vicinity of the toe of the bluff; connecting an end of the drill string at the face of the bluff adjacent the toe of the bluff to a proximal end of a protective pipe surrounding and isolating a wicking drain along an entire length thereof for channeling water accumulated in the bluff; retracting the drill string from the out hole at the top surface of the bluff so as to drag the wicking drain and surrounding protective pipe through the out hole bringing the proximal end of the wicking drain and the surrounding protective pipe to the top surface of the bluff, and a distal end of the wicking drain and surrounding protective pipe to the face of the bluff adjacent the toe of the bluff; holding only the wicking drain from the protective pipe when the proximal end of the protective pipe reaches the top surface of the bluff; and withdrawing the protective pipe from the bluff while the wicking drain is held so that only the wicking drain extends between the top surface of the bluff and the face of the bluff for directing water accumulated in the wicking drain via an outlet end away from the face of the bluff.

The step of advancing a drilling string in the horizontal hole is performed using a horizontal directional boring machine located at the top surface of the bluff. The step of connecting an end of the drill string to a proximal end of a wicking drain, and the step of withdrawing the protective pipe are performed by a worker and apparatus positioned at the face of the bluff adjacent the toe of the bluff. The step of advancing a drill string includes inserting a slurry from the out hole at the top surface of the bluff. Alternatively, the step of withdrawing the protective pipe is performed from the out hole at the top surface of the bluff.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
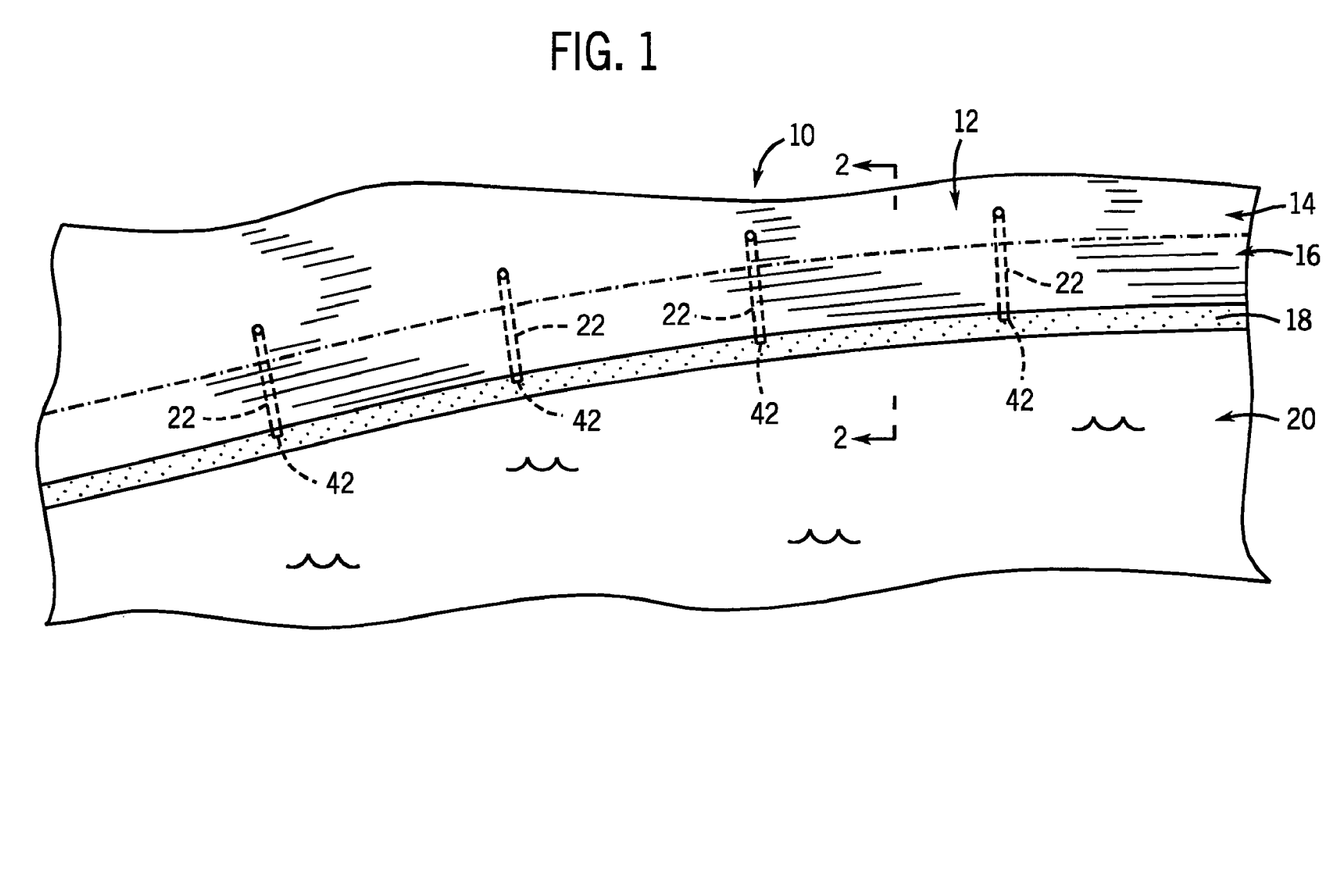
FIG. 1 is a fragmentary, plan view of a bluff equipped with a wicking drain in accordance with the invention.

Referring to the drawings, FIG. 1 illustrates an improved de-watering or drainage system 10 in accordance with the present invention which is installed in a bluff 12 having a crest 14 and a slope 16 extending from the crest downwardly to a beach 18 located adjacent a body of water, such as a lake 20. As discussed previously herein, the system 10 is intended to safeguard the land mass and profile of the bluff by controlling the internal water seepage so as to prevent erosion thereof. At the outset, it should be appreciated that the invention contemplates the provision of at least one elongated drain member or wicking drain 22 installed internally in the bluff 12 in a manner to be described. In the preferred embodiment, several identical wicking drains 22, each having a typical length of about 300 to 400 feet, are installed substantially parallel to and spaced from one another along a length of bluff 12 approximately 3,000 feet long. It should be understood that while the drain member 22 is preferably provided in the form of a wicking drain, the drain member 22 may also take on other suitable forms such as an elongated perforated pipe which may or may not be surrounded by other structure.

Figure 2:
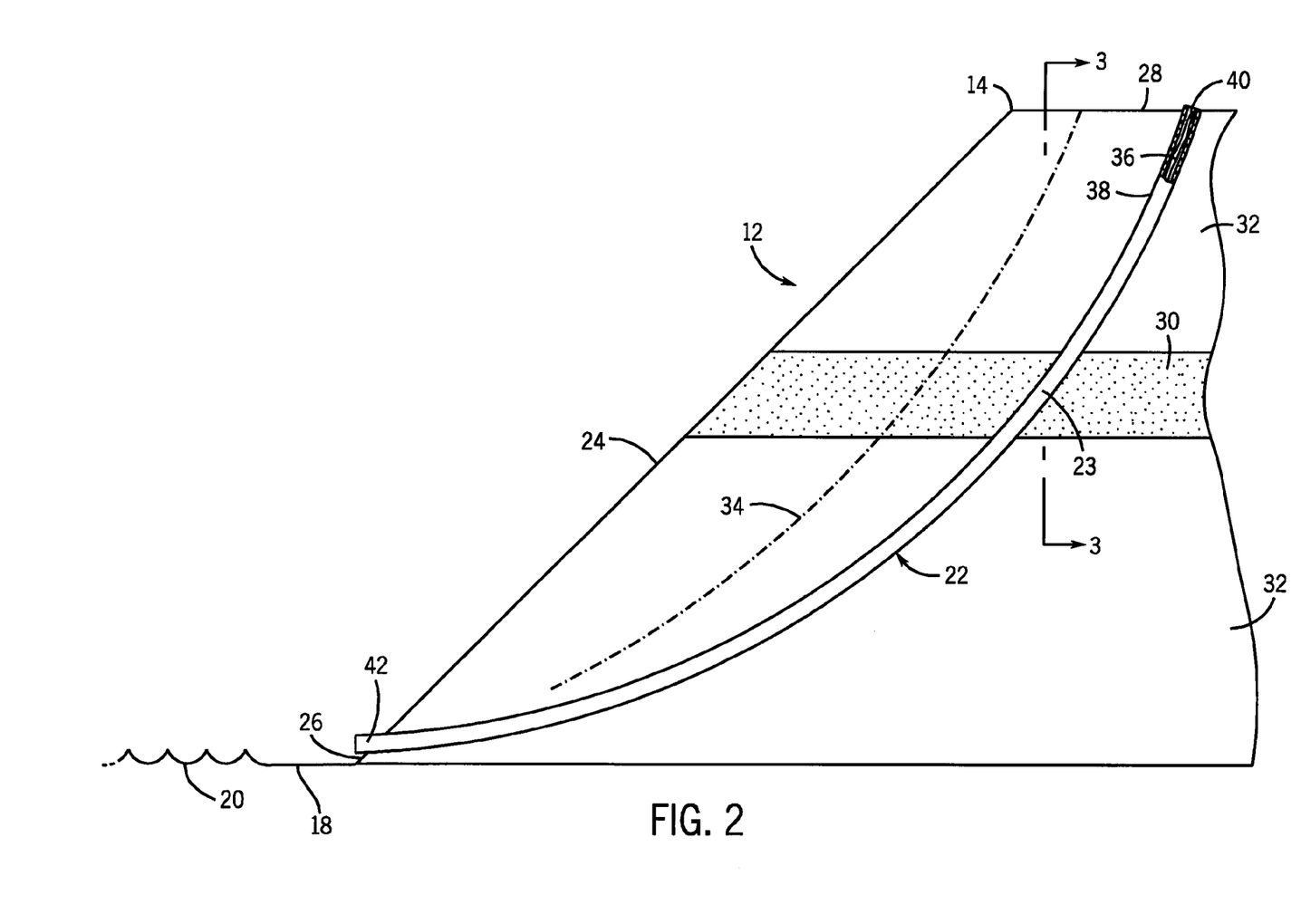
FIG. 2 is an enlarged, sectional view taken on line 2—2 of FIG. 1.
Figure 3:
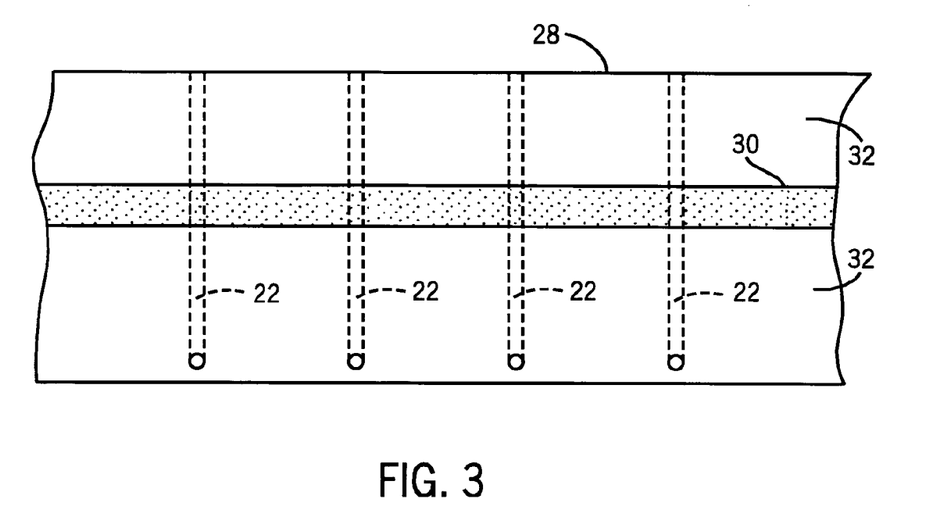
FIG. 3 is a sectional view taken on line 3—3 of FIG. 2.

Referring to FIGS. 2 and 3, the invention is particularly suitable for bluffs 12 having slopes of at least 45 degrees from the horizontal. Bluff 12 includes a face 24 which extends upwardly and inwardly from a toe or foot 26 to the crest 14. The crest 14 defines the forwardmost limit of a generally horizontal top surface 28 of the bluff 12 which runs substantially parallel to the beach 18 at the lake level. The bluff 12 typically includes a water bearing layer 30 (in this case, a sand or sand and silt layer having various strata) which is interposed between two layers 32 of relatively impermeable clay. In an exemplary bluff 12 having a height of 80–120 feet, the water bearing sand layer 30 is typically formed between the 40 foot and 50 foot depth levels. While the water bearing layer 30 is shown as being horizontal, it should be noted that the layer 30 may undulate in various paths throughout the bluff 12. Water accumulated in the bluff 12 tends to flow freely outwardly through the sand layer 30 towards the face 24 of the bluff 12. If unchecked, this drainage will, over time, erode the face 24 of the bluff until a bluff failure shear plane 34 is reached, at which point severe erosion in the form of a landslide occurs.

In accordance with the invention, drain member or wicking drain 22 is positioned behind the shear failure plane 34 and extends downwardly and forwardly through the entire height of the water bearing layer 30 to the face 24 of the bluff 12 without drilling or excavating from the face 24 thereof. The wicking drain 22, as shown in FIG. 2, is fabricated of at least one and occasionally several corrugated plastic rolls or cores 36 which are surrounded longitudinally by a geotextile, meshed fabric sleeve 38 that allows easy water entry while preventing entry of soil particles. Drain clogging can be prevented if the fabric sleeve 38 is properly matched to the soil type. The corrugated cores 36 are cheaply produced by extrusion of acceptable plastic material such as polyethylene. The geotextile fabric sleeve 38 may be manufactured of, for example, a non-woven polypropylene filter material. Because there are no obstructions to the flow of water in the channels of the corrugated core 36, flow capacity is very high. FIGS. 2 and 3 show the manner in which each wicking drain 22 extends from a proximal end 40 at the top surface of the bluff 12 continuously downwardly and forwardly via a medial portion 23 through the entire height of layer 30 along a single radius. Each wicking drain 22 curves outwardly and forwardly along the single radius towards the face 24 of the bluff 12, and terminates in a distal end portion 42 (FIG. 1) projecting from the face 24 adjacent the toe 26 about 5 feet above the beach level. The distal end portion 42 transports wick-collected water in the bluff 12 from the bottom end of the face 24 of the bluff 12 over the beach 18 and into the lake 20. If desired, the distal end 42 of wicking drain 22 can flow into crushed rock rip-rap on the beach 18 for erosion scour protection.

A further important aspect of the present invention resides in the method in which the drainage system 10 is installed. Installation of the wicking drains 22 is accomplished from the top surface 28 rather than from the face 24 of the bluff 12.

Figure 4:
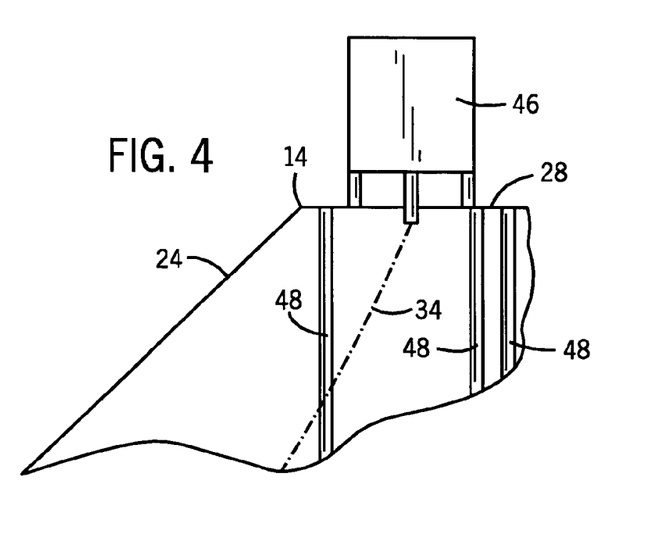
FIG. 4 is fragmentary representation of a vertical drilling machine used to take soil samples to establish the failure shear plane and to locate water bearing layers for the wicking drain.

With reference to FIG. 4, the first step of the drain member or wicking drain installation procedure relates to the locating of the bluff shear failure plane 34. A conventional mobile vertical drilling machine 46 is positioned on the top surface 28 of the bluff 12 near the crest 14. Upon drilling of several holes 48, a geological engineer drills vertical sampling holes 48 to the beach 18 to construct a soil profile in shear plane 34 and to locate the water level and the water bearing seams. It is critical that the placement of any drainage system is located behind (that is, in the direction away from) the shear failure plane 34 so as to avoid causing a landslide.

Figure 5:
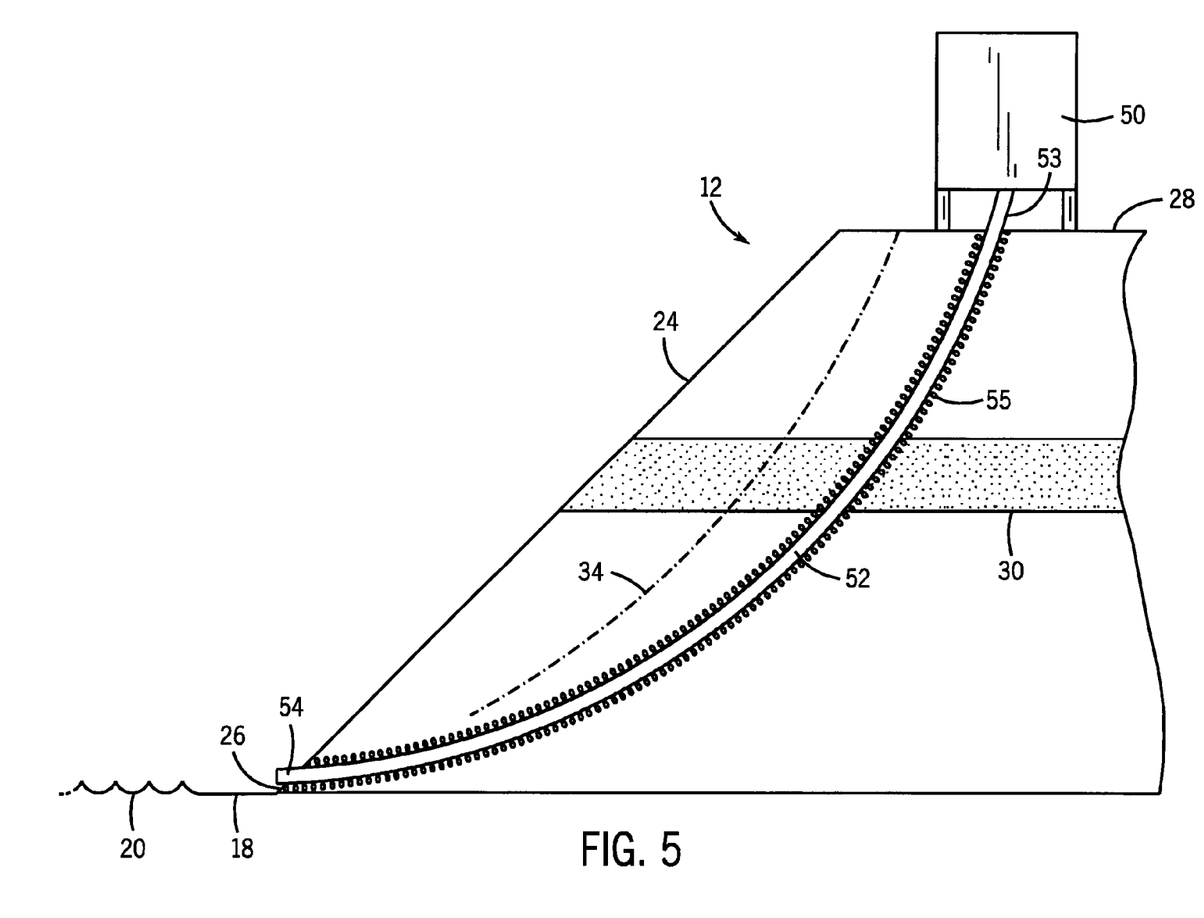
FIG. 5 is a representation of a horizontal boring machine used to insert a drill string for drilling a wick receiving hole through a water bearing layer of the bluff.

Once the shear failure plane 34 is identified, a conventional mobile horizontal directional boring (HDB) machine 50 (FIG. 5) is positioned on the top surface 28 of the bluff 12 for the purpose of drilling a substantially downwardly and forwardly extending curved hole or bore (typically four inches in diameter) for a length of about 300 to 400 feet towards the bottom end of the face 24. As is known, the HDB machine 50 has a drill string 52 with a distal end 54 (FIG. 6) that is traceable by a worker positioned on the top surface 28 of the bluff 12 and spaced in front of the machine 50 with an electronic tracking device so as to direct its path in the bluff 12. In the preferred embodiment, the drill string 52 progresses from an out hole 53 formed in the top of the bluff 12 downwardly and forwardly on a single radius towards the face 24 of the bluff 12 moving through the entire height of the sand layer 30 which happens to be an easily locatable water saturated layer in the bluff 12. In FIG. 5, the drill string 52 continuously traverses along a radial path in a downwardly and forwardly direction without any lateral path of drilling. The radial path of the drill string 52 is always at a location behind the shear failure plane 34. As the drill string 52 advances, a polymer slurry 55 is deposited inside the formed hole for preventing the hole from collapsing and enabling at least a friction reduced removal of the drill string 52. After traveling its preferred length, the distal end 54 of the drill string 52 curves outwardly to the face 24 of the bluff 12 (FIG. 6) approximately 5 feet above the beach level where drilling is terminated.

Figure 6:
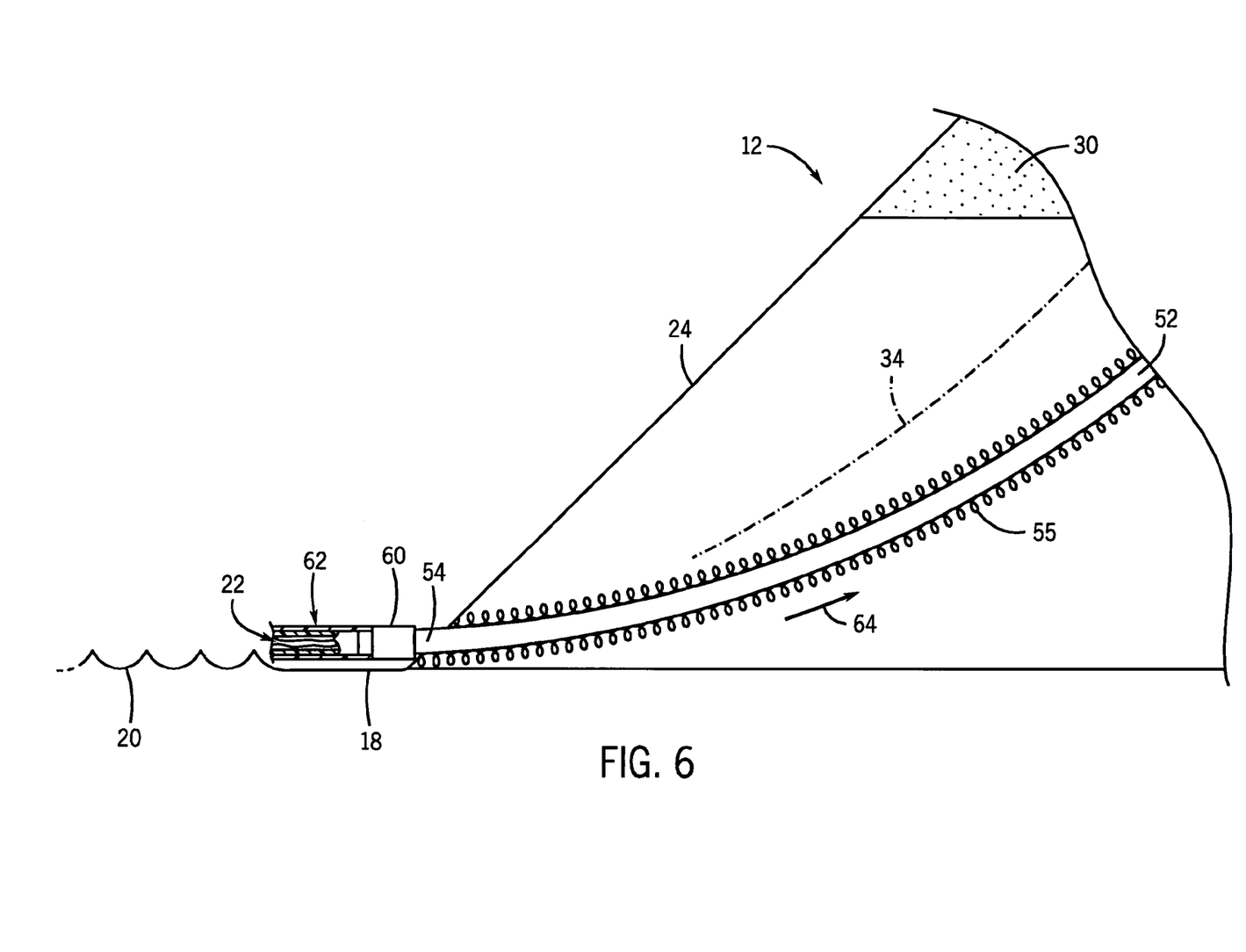
FIG. 6 is a fragmentary representation of a process used to facilitate attachment of one end of a protective pipe holding a wicking drain to the end of the horizontal boring drill string.

At this point, a worker positioned on the beach 18 threads the wicking drain 22 into a protective pipe 62 continuously surrounding and isolating the drain 22 along its length, and attaches only a proximal end 60 of protective pipe 62 holding the wicking drain 22 to the end 54 of drill string 52 as seen in FIG. 6. Once this connection has been made, the drill string 52 is retracted in the formed hole in the direction of arrow 64, pulling protective pipe 62 in the wicking drain 22 along with it until the proximal end 60 reaches the out hole 53 in the top surface 28 of the bluff 12 at which point the drill string 52 is disconnected from the wicking drain 22. As mentioned above, retraction of the drill string 52 is facilitated by the low friction polymer slurry 55 inside the hole.

Figure 7:
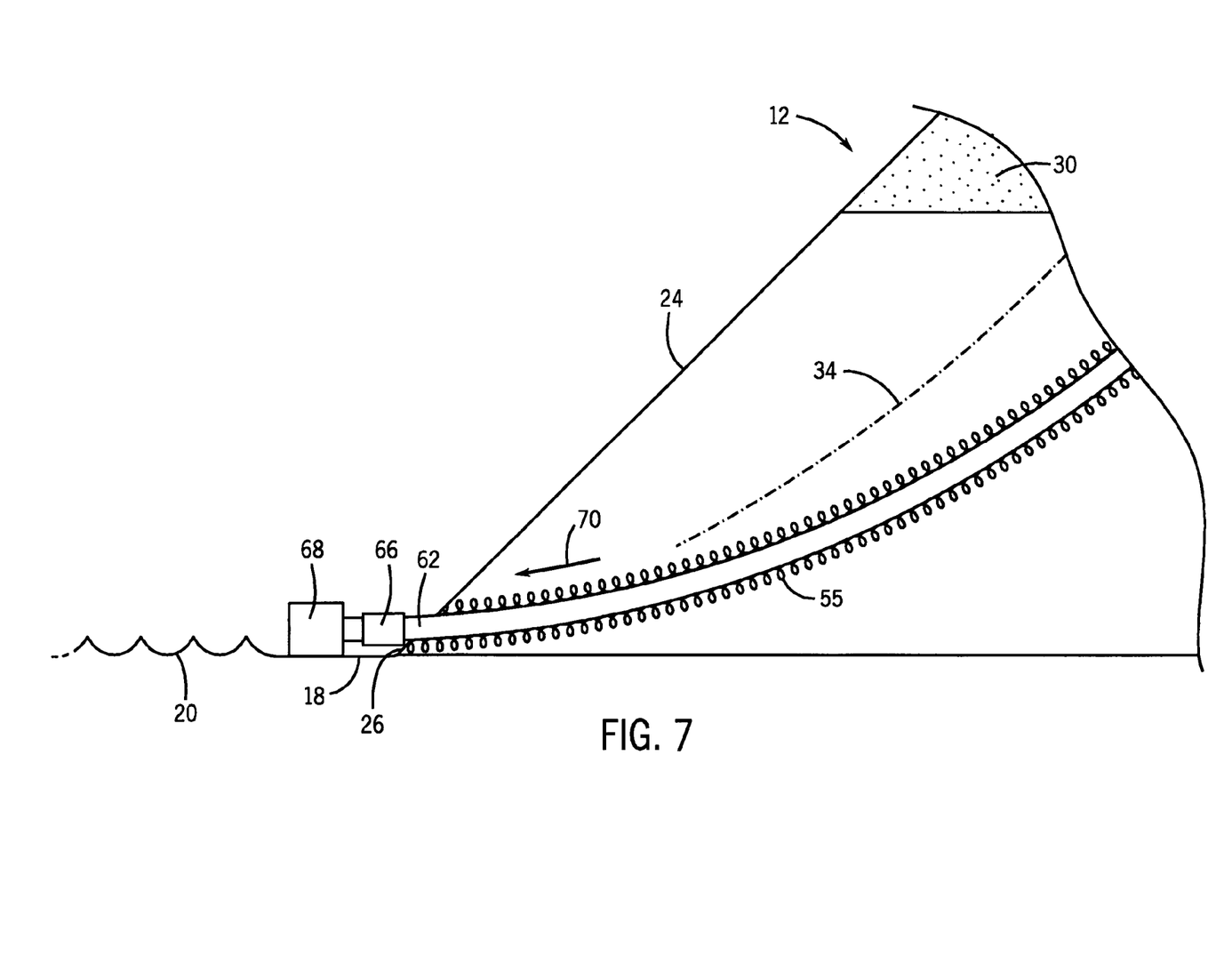
FIG. 7 is a fragmentary representation of a process used to withdraw the protective pipe to leave the wicking drain in the bluff.

The proximal end 40 of the wicking drain 22 only is then held at the out hole 53 while the distal end of the protective pipe 62 at the face 24 of the bluff 12 is attached by a retaining device 66 to a pulling mechanism such as a mini-excavator 68 on the beach 18 as shown in FIG. 7. The excavator 68 is moved to withdraw and strip the protective pipe 62 in the direction of arrow 70 from the formed hole leaving only the wicking drain 22 between the out hole 53 at the top surface 28 of the bluff 12 and the face 24 thereof. It should be appreciated that the protective pipe 62 safeguards the wicking drain 22 during installation so that the drain 22 is not abraded, torn or damaged. Again, the withdrawal of the protective pipe 62 is enhanced by the slurry 55.

Alternatively, the distal end 42 of the wicking drain 22 only can be held adjacent the toe 26 of the bluff 12, such as by the excavation 68, while the proximal end 60 of the protective pipe 62 is pulled from the out hole 53 at the top surface 28 of the bluff 12. Again, this isolates the wicking drain 22 in place between the out hole 53 and the face 24 of the bluff 12.

With the wicking drain 22 in place within the bored hole, the proximal end 40 of the wicking drain 22 is released and the distal end 42 projects from the face 24 of the bluff 12 as seen in FIG. 2. Water accumulated in the wicking drain 22 flows outwardly over the beach 18 and is returned to the adjacent lake 20. Similar installations are repeated for the desired number and spacing of multiple drain members or wicking drains 22.

It should be understood that once in use, the polymer slurry 55 lining the hole holding the wicking drain 22 will simply be filtered by the fabric sleeve 38 and then be flushed away (as seen in FIG. 2) by accumulating water seeping into the bore formed by the drill string 52.

While the system and method described above are particularly beneficial for control of water drainage in a lakeside or oceanside bluff 12, it should also be appreciated that the present invention has a wider range of application for other sloped land masses. For example, a hillside sloping down to a highway also requires soil stabilization to prevent landslides which can impair traffic flow and cause danger to those traveling in vehicles on the highway. Using the equipment and procedures previously discussed, soil erosion can be effectively managed.

The present invention thus provides for a bluff or hillside erosion prevention system which is able to accumulate much larger soil quantities of drainage water than the prior art by placing wicking drains 22 behind the shear failure plane 34 downwardly and forwardly along a radius through a water saturated zone 30. It is extremely noteworthy that the positioning and location of such wicking drains 22 are accomplished from the top 28 of the bluff or hillside 12; that is, there is no drilling or excavating of the bluff or hillside 12 from the face 24 thereof. Not only is this important so as to avoid causing early landslides, but also physical installation is made less dangerous and more universally possible. For example, in a bluff application, it may be physically impossible to locate large excavating and/or drilling equipment on a beach 18 having a low elevation and reduced width or unstable composition. For wicking drains 22 installed from the face 24 of the hillside 12 it is unsafe to have working equipment penetrating the slope 16 of the hillside 12 with ongoing traffic flowing in close vicinity.

It is also important to note that passing the wicking drains 22 through the entire height of the water saturated zone 30 allows water to be drained from various strata in the zone 30 so that there is better drainage. Results have shown that the water level in the bluff 12 has been lowered an additional 40 feet from its original water level with the upgraded system 10 which leads to more efficient stabilization of the bluff 12. Not only does the present invention provide for a desired lowering of the water level, but the installation is easier because it is not necessary to require an intense signal monitoring to maintain location of the wicking drain 22 within the water saturated zone 30. Furthermore, the wicking drain 22 is better safeguarded against damage during installation due to the protective pipe 62.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

I claim:

1. In a system for preventing erosion of a bluff or hillside having a face extending between a toe at a bottom thereof and a crest at a top surface thereof, a water saturated zone extending rearwardly from the face and a failure shear plane spaced from the face, the bluff or hillside being subject to excess water accumulation contributing to land mass degradation thereof, the improvement comprising:

at least one elongated drain member positioned behind the failure shear plane and extending continuously only downwardly and forwardly along a radius through the water saturated zone between the top surface of the bluff and the face of the bluff for the purpose of controlling drainage of the excess water accumulation, the drain member having a proximal end located at the top surface of the bluff or hillside, a medial portion extending completely through an entire height of the water saturated zone, and a distal end projecting from the face of the bluff or hillside adjacent the toe thereof, the drain member intercepting water throughout the entire height of the water saturated zone before reaching the shear failure plane.

2. The improvement of claim 1, wherein multiple drain members are positioned along a length of the bluff in parallel, spaced apart relationship with one another.

3. The improvement of claim 1, wherein the drain member is installed in a hole formed by a horizontal directional boring machine positioned on the top surface of the bluff or hillside.

4. In a bluff lying adjacent a body of water and having a shear failure plane spaced from a face extending from a toe at a bottom of the bluff to a crest at a top surface of the bluff and a water saturated zone extending rearwardly from the face, a drainage system for preventing erosion of the bluff caused by excess water forces acting outwardly towards the face of the bluff, the system comprising:

an elongated bore extending continuously downwardly and forwardly only, on a radius through an entire height of the water saturated zone towards the face of the bluff behind the shear failure plane and having a first end at the top surface of the bluff and a second end at a lower elevation exiting through a bottom end of the face of the bluff adjacent the toe, the bore being started from the top surface of the bluff; and an elongated wicking drain having a plastic corrugated core surrounded by a filtering fabric, the wicking drain being positioned within the bore and further having a proximal end at the first end of the bore, a medial portion extending through the entire height of the water saturated zone and a distal end at the second end of the bore the drain intercepting water throughout the entire height of the water saturated zone before reaching the shear failure plane.

5. The system of claim 4, wherein the water saturated zone includes a water attracting sand layer.

6. The system of claim 4, wherein the bore includes a slurry for facilitating the positioning of the wicking drain therein.

7. A method for preventing erosion and a face of a bluff having accumulated water therein, the face running from a toe of the bluff to a crest of the bluff at a top surface thereof, the method comprising the steps of:

drilling a series of substantially vertical holes into the top surface of the bluff to locate a shear failure plane behind the line extending from the toe of the bluff to the top surface of the bluff, and to locate water in the bluff;

advancing a drill string behind the shear failure plane from an out hole at the top surface of the bluff continuously downwardly and forwardly on a radius through an entire height of a water saturated zone extending rearwardly from the face, and then outwardly along the radius to the face of the bluff in the vicinity of the toe of the bluff;

connecting an end of the drill string at the face of the bluff adjacent the toe of the bluff to a proximal end of a protective pipe surrounding and isolating a wicking drain along an entire length thereof for channeling water accumulated in the bluff;

retracting the drill string from the out hole at the top of the bluff so as to drag the wicking drain and surrounding protective pipe through the out hole bringing the proximal end of the wicking drain and surrounding protective pipe to the top surface of the bluff and a distal end of the wicking drain and surrounding protective pipe to the face of the bluff adjacent the toe of the bluff;

holding only the wicking drain from the protective pipe when the proximal end of the protective pipe reaches the top surface of the bluff; and withdrawing the protective pipe from the bluff while the wicking drain is held so that only the wicking drain extends between the top surface of the bluff and the face of the bluff for directing water accumulated in the wicking drain via an outlet end away from the face of the bluff.

8. The method of claim 7, wherein the step of advancing a drill string in a horizontal hole is performed using a horizontal directional boring machine located at the top surface of the bluff.

9. The method of claim 7, wherein the step of connecting an end of the drill string to a proximal end of a wicking drain, and the step of withdrawing the protective pipe are performed by a worker and apparatus positioned at the face of the bluff adjacent to the toe of the bluff.

10. The method of claim 7, wherein the step of advancing a drill string includes inserting a slurry from the out hole at the top surface of the bluff.

* * * * *